(12) United States Patent
Ngo

(10) Patent No.: US 6,817,780 B2
(45) Date of Patent: Nov. 16, 2004

(54) GUIDE BOOT FOR A FIBER-OPTIC CABLE

(75) Inventor: Hung Viet Ngo, Harrisburg, PA (US)

(73) Assignee: FCI Americas Technology, Inc., Reno, NV (US)

( * ) Notice: Subject to any disclaimer, the term of this patent is extended or adjusted under 35 U.S.C. 154(b) by 16 days.

(21) Appl. No.: 10/342,627

(22) Filed: Jan. 15, 2003

(65) Prior Publication Data
US 2004/0136657 A1 Jul. 15, 2004

(51) Int. Cl.⁷ .................................................. G02B 6/36
(52) U.S. Cl. ................................................ 385/86; 76/87
(58) Field of Search .............................. 385/72–78, 86, 385/87

(56) References Cited

U.S. PATENT DOCUMENTS

| | | | |
|---|---|---|---|
| 4,439,005 A | 3/1984 | Winzer | 350/96.15 |
| 5,073,044 A | 12/1991 | Egner et al. | 385/86 |
| 5,138,678 A | 8/1992 | Briggs et al. | 385/86 |
| 5,202,942 A | 4/1993 | Collins et al. | 385/87 |
| 5,329,603 A | 7/1994 | Watanabe et al. | 385/86 |
| 5,347,603 A | 9/1994 | Belenkiy et al. | 385/86 |
| 5,390,272 A | 2/1995 | Repta et al. | 385/100 |
| 5,425,119 A | 6/1995 | Lee et al. | 385/86 |
| 5,530,787 A | 6/1996 | Arnett | 385/137 |
| 5,570,443 A | 10/1996 | May et al. | 385/75 |
| 5,640,476 A | 6/1997 | Womack et al. | 385/86 |
| 5,710,851 A | 1/1998 | Walter et al. | 385/86 |
| 5,781,681 A | 7/1998 | Manning | 385/86 |
| 5,892,871 A | 4/1999 | Dahan et al. | 385/86 |
| 5,915,056 A * | 6/1999 | Bradley et al. | 385/76 |
| 5,933,557 A | 8/1999 | Ott | 385/86 |
| 6,019,521 A | 2/2000 | Manning et al. | 385/77 |
| 6,130,983 A | 10/2000 | Cheng | 385/139 |
| 6,134,370 A | 10/2000 | Childers et al. | 385/135 |
| 6,601,997 B2 * | 8/2003 | Ngo | 385/86 |
| 6,674,951 B1 * | 1/2004 | Erwin et al. | 385/86 X |

FOREIGN PATENT DOCUMENTS

| | | |
|---|---|---|
| FR | 2 703 839 | 10/1994 |
| WO | WO 02/19473 A1 | 3/2002 |

OTHER PUBLICATIONS

Product Information, "Corning® 62.5/125 CPC6 Multi-mode Optical Fiber", 1996, 1 page.
Product Information, "Corning ® 50/125 CPC6 Multimode Optical Fiber", 1996, 1 page.

* cited by examiner

Primary Examiner—Phan T. H. Palmer
(74) Attorney, Agent, or Firm—Woodcock Washburn LLP

(57) ABSTRACT

A preferred embodiment of a guide boot for a fiber-optic cable mechanically coupled to a connector comprises a mating portion having an interior surface defining a passage for receiving a portion of the connector and the fiber-optic cable, and a plurality of ribs formed on the interior surface and extending along at least a portion of a length of the mating portion. A preferred embodiment of a guide boot also comprises a body portion adjoining the mating portion and having an interior surface that defines a passage for receiving the fiber-optic cable. The interior surface of the body portion is curved so that the body portion bends the fiber-optic cable.

26 Claims, 10 Drawing Sheets

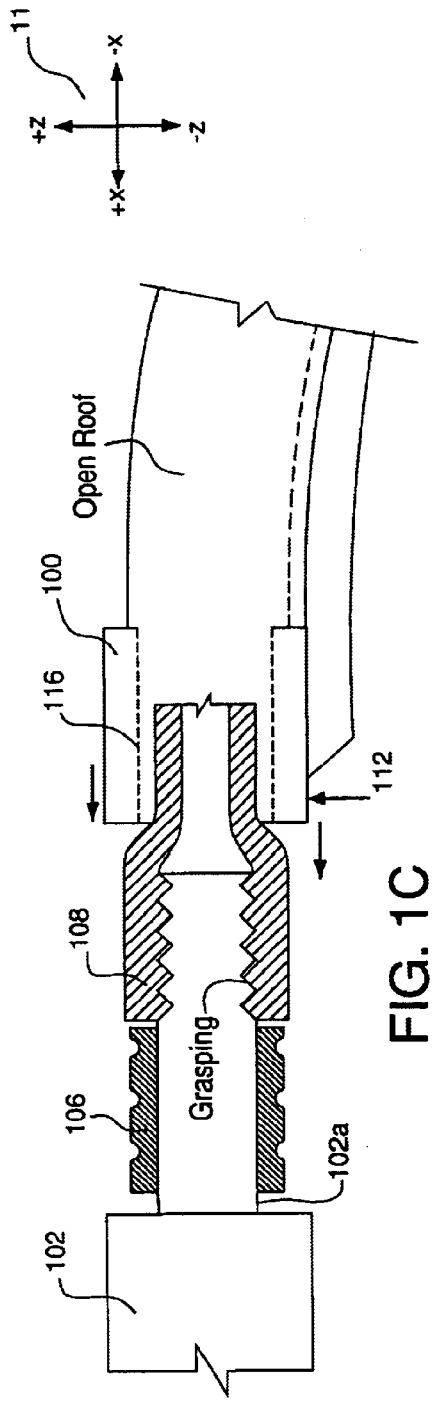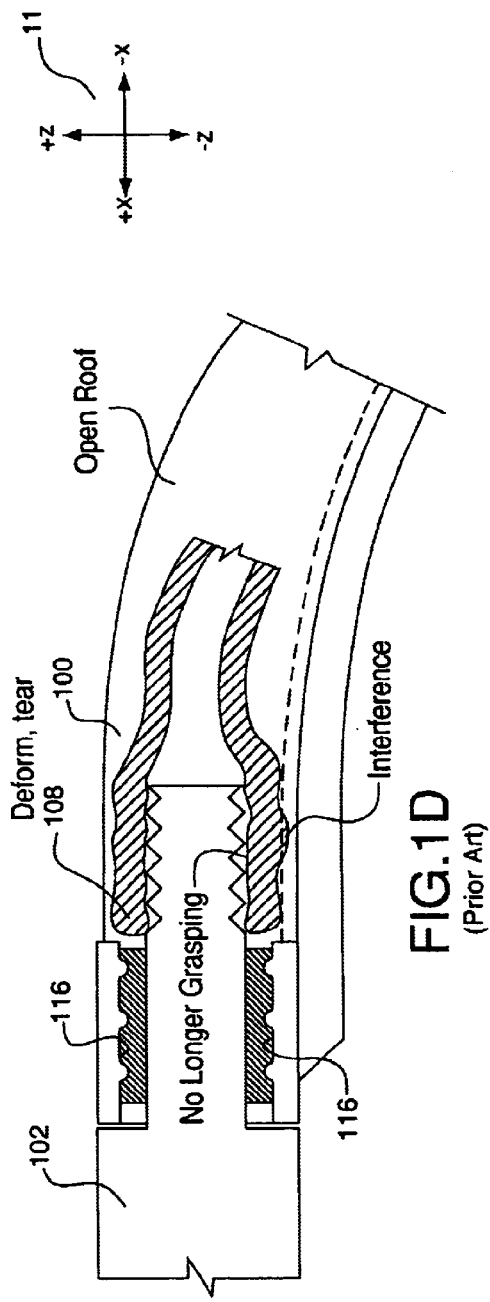

GUIDE BOOT FOR A FIBER-OPTIC CABLE

FIELD OF THE INVENTION

The present invention relates to fiber-optic cable used for the conducting optical signals. More particularly, the present invention relates to a guide boot for bending a fiber-optic cable, and maintaining the bend radius of the fiber-optic cable at or above a predetermined value.

BACKGROUND OF THE INVENTION

Fiber-optic cables are commonly used to transmit optical signals between optoelectronic devices. A conventional fiber-optic cable can include an optically-conductive optical fiber, and a protective inner jacket that surrounds the optical fiber and protects the optical fiber from buckling. The inner jacket can be surrounded by a layer of protective fibers having sufficient strength to withstand the maximum anticipated tensile forces on the fiber-optic cable. The protective fibers can be enclosed in a flexible outer jacket.

Excessive bending or twisting of a fiber-optic cable can degrade the quality of the optical signals transmitted through the fiber-optic cable. In extreme cases, excessive bending or twisting can break the optical fiber within the fiber-optic cable. In practice, fiber-optic cables must often be bent to facilitate routing to, from, or within equipment such as computers, connector panels, junction boxes, etc. Accordingly, fiber-optic cables are typically evaluated to determine a minimum bend radius. The minimum bend radius represents the minimum radius at which the fiber-optic can be bent without potentially degrading signal-transmission quality, or damaging the optical fiber within the fiber-optic cable.

Connectors are commonly used to couple fiber-optic cables to other fiber-optic cables, or to optoelectronic devices such as sources, detectors, repeaters, switches, attenuators, etc. The point at which a fiber-optic cable enters a connector is particularly susceptible to being bent in excess of, i.e., more sharply than, the minimum bend radius for the fiber-optic cable.

A guide boot is often used to maintain the bend radius of a fiber-optic cable at or above the minimum bend radius as the fiber-optic cable approaches and enters a connector. FIGS. 1A and 1B depict a conventional guide boot 100 used in conjunction with an LC-type connector 102 and a fiber-optic cable 104. The figures are each referenced to a common coordinate system 11 depicted therein.

The cable 104 is mechanically coupled to the connector 102 using a metallic crimp sleeve 106 and a shrink tube 108 (see FIG. 1B). The crimp sleeve 106 is crimped over a substantially cylindrical rear mating portion 102a of the connector 102. The shrink tube 108 securely grasps the crimp sleeve 106 and the outer jacket of the cable 104, and thereby secures the cable 104 to the crimp sleeve 106 (and the connector 102).

The guide boot 100 has passages formed therein for receiving the cable 104. The guide boot 100 is mated with the connector 102 by threading a free end of the cable 104 through the passages, and advancing the guide boot 100 along the cable 104.

A forward, or mating, portion 112 of the guide boot 100 eventually reaches the crimp sleeve 106 as the guide boot 100 is advanced along the cable 104, as shown in FIG. 1B. A force (hereinafter referred to as an "insertion force") is exerted on the guide boot 100 to advance the mating portion 112 over the crimp sleeve 106 (and over the portion of the shrink tube 108 installed over the crimp sleeve 106), in the direction denoted by the arrow 120 in FIG. 1B.

The crimp sleeve 106 becomes disposed within the passage in the mating portion 112 as the guide boot 100 is advanced over the crimp sleeve 106. The insertion force needed to advance the guide boot 100 is due, in part, to friction between an inner surface 116 of the mating portion 112, and the portion of the shrink tube 108 installed over the crimp sleeve 106. The guide boot 100 is retained on the connector 102 primarily by friction between the inner surface 116 of the mating portion 112 and the crimp sleeve 106.

The guide boot 100 includes a curved body portion 116. The body portion 116 should have a radius of curvature approximately equal to or greater than the minimum bend radius of the cable 104. The body portion 116 imparts a corresponding curve to the cable 100 when the cable 100 is installed the passage 110. The body portion 116 is sufficiently rigid to prevent the cable 104 from being bent in excess of its minimum bend radius.

The guide boot 100 can be rotated in relation to the connector 102 to direct the cable 104 toward a desired location. The guide boot 100 is rotated by imparting a torque to the guide boot 100 sufficient to overcome the friction between the inner surface 116 of the mating portion 112 and the crimp sleeve 106. (The cable 104, which is secured to the connector 102 by way of the shrink tube 108 and the crimp sleeve 106, normally rotates with the mating portion 112, and in a perfect world would do so without any twist being imparted thereon.)

However, the insertion force needed to advance the guide boot 100 over the shrink tube 108 until it reaches the crimp sleeve 106 in many instances damages the shrink tube 108. Such is shown in FIGS. 1C and 1D. In particular, the force needed to overcome the friction between the inner surface 116 of the mating portion 112 and the portion of the outer surface of the shrink tube 108 installed over the crimp sleeve 106 will deform, tear, or otherwise damage the shrink tube 108.

This damage to the shrink tube 108 can cause the shrink tube 108 to lose its firm grasp of the rear mating portion 102a of the connector 102. Furthermore, damage to the shrink tube 108 will result in a loss of the frictional/interference fit between the shrink tube 108 and inner surface 116. Thus, rotating the guide boot 100 to a desired orientation on the connector 102 when the shrink tube 108 has been damaged and its grasp on the rear mating portion 102a of the connector 102 lost, can cause a corresponding rotation of the cable 104. Rotating the cable 104 in this manner will twist the underlying optical fiber, which is independently restrained from rotation within the connector 102. Twisting the optical fiber can degrade the light-conducting characteristics thereof, and can thereby decrease the quality of the signals transmitted through the cable 104. Moreover, twisting of the optical fiber, if extreme, can break the optical fiber.

SUMMARY OF THE INVENTION

A preferred embodiment of a guide boot for a fiber-optic cable mechanically coupled to a connector comprises a mating portion having an interior surface defining a passage for receiving a portion of the connector and the fiber-optic cable, and a plurality of ribs formed on the interior surface and extending along at least a portion of a length of the mating portion. A preferred embodiment also comprises a body portion adjoining the mating portion and having an interior surface that defines a passage for receiving the fiber-optic cable. The interior surface of the body portion is curved so that the body portion bends the fiber-optic cable.

A preferred embodiment of a guide boot for bending a fiber-optic cable mechanically coupled to a connector by way of a crimp sleeve and a shrink tube comprises a mating portion. The mating portion has an interior surface defining a passage for receiving the crimp sleeve and a portion of the shrink tube installed over the crimp sleeve. The passage has a diameter greater than an outer diameter of the portion of the shrink tube installed over the crimp sleeve and the interior surface has a plurality of ribs formed thereon for contacting the crimp sleeve. A preferred embodiment also comprises a body portion adjoining the mating portion and having an interior surface defining a passage for receiving the fiber-optic cable.

A preferred embodiment of a system for conducting optical signals comprises a connector, a crimp sleeve fixed to the connector, a fiber-optic cable, and a shrink tube having a first portion fixed to the crimp sleeve and a second portion fixed to the fiber-optic cable. A preferred embodiment also comprises a guide boot comprising a mating portion. The mating portion has an interior surface defining a passage for receiving the crimp sleeve and the first portion of the shrink tube. The passage has a diameter greater than an outer diameter of the first portion of the shrink tube and the interior surface has a plurality of ribs formed thereon for contacting the crimp sleeve. The mating portion also comprises a body portion adjoining the mating portion and having an interior surface defining a passage for receiving the fiber-optic cable.

A preferred method for mating a guide boot with a connector mechanically coupled to a fiber-optic cable by way of a crimp sleeve and a shrink tube comprises inserting the fiber-optic cable through a passage formed in the guide boot, advancing the guide boot along the fiber-optic cable, advancing the guide boot onto the crimp sleeve so that a plurality of ribs formed on an internal surface of the guide boot interferely contact the crimp sleeve and a portion of the shrink tube installed over the crimp sleeve, and rotating the shrink tube so that the fiber-optic cable extends from the guide boot in a desired direction.

BRIEF DESCRIPTION OF THE DRAWINGS

The foregoing summary, as well as the following detailed description of a presently-preferred embodiment, is better understood when read in conjunction with the appended drawings. For the purpose of illustrating the invention, the drawings show an embodiment that is presently preferred. The invention is not limited, however, to the specific instrumentalities disclosed in the drawings. In the drawings:

FIG. 1C is a cross sectional view showing the installation of the conventional guide boot shown in FIGS. 1A and 1B being installed on the fiber optic cable and mated with the connector as shown in FIGS. 1A and 1B;

FIG. 1D is a cross sectional view of the conventional guide boot installed on the fiber optic cable and mated with the connector shown in FIGS. 1A–1C, and showing the damage caused by the installation thereof;

DESCRIPTION OF PREFERRED EMBODIMENTS

A preferred embodiment of a guide boot 10 for a fiber-optic cable is depicted in FIGS. 2 and 5–10. The figures, as noted previously, are each referenced to a common coordinate system 11 depicted therein. The guide boot 10 is described in conjunction with a conventional LC-type fiber-optic connector 12. The use of the guide boot 10 in combination with the connector 12 is disclosed for exemplary purposes only. The guide boot 10 can be used with other types of fiber-optic connectors including, for example, SC-type connectors.

Figure 1A:
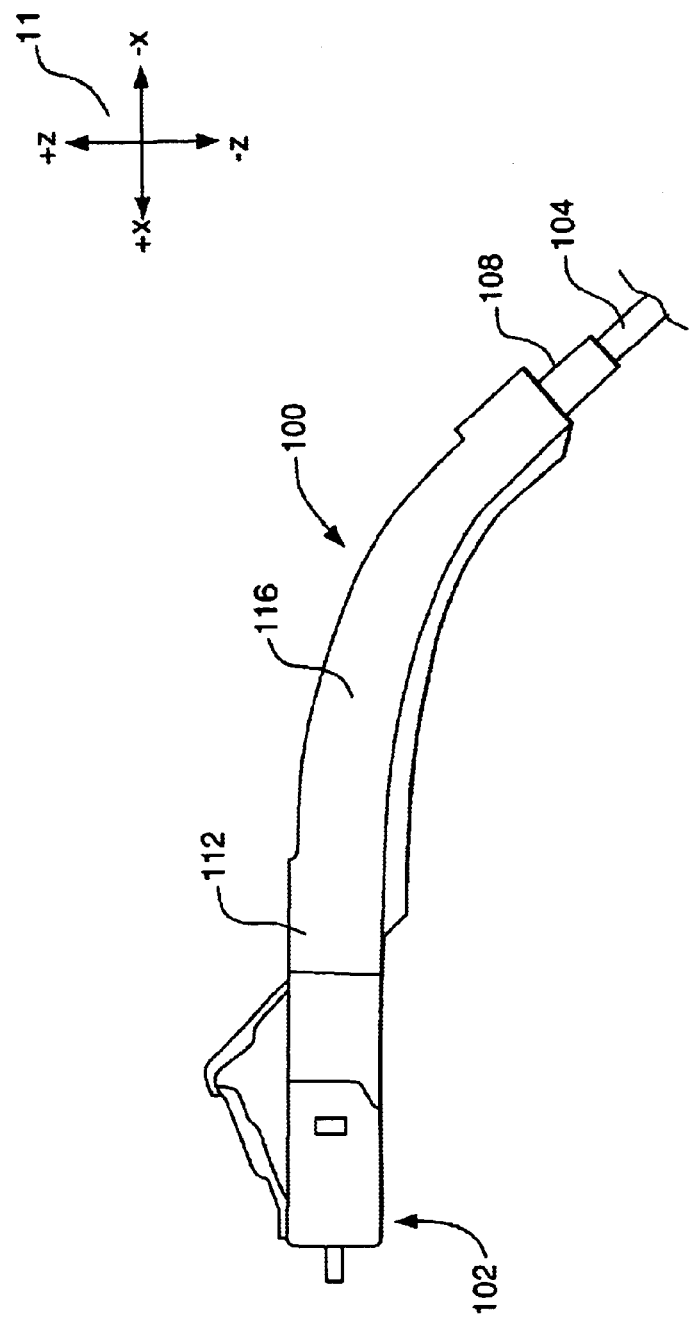
FIG. 1A is a side view of a conventional guide boot installed on a fiber optic cable and mated with a connector mechanically coupled to the fiber-optic cable.
Figure 1B:
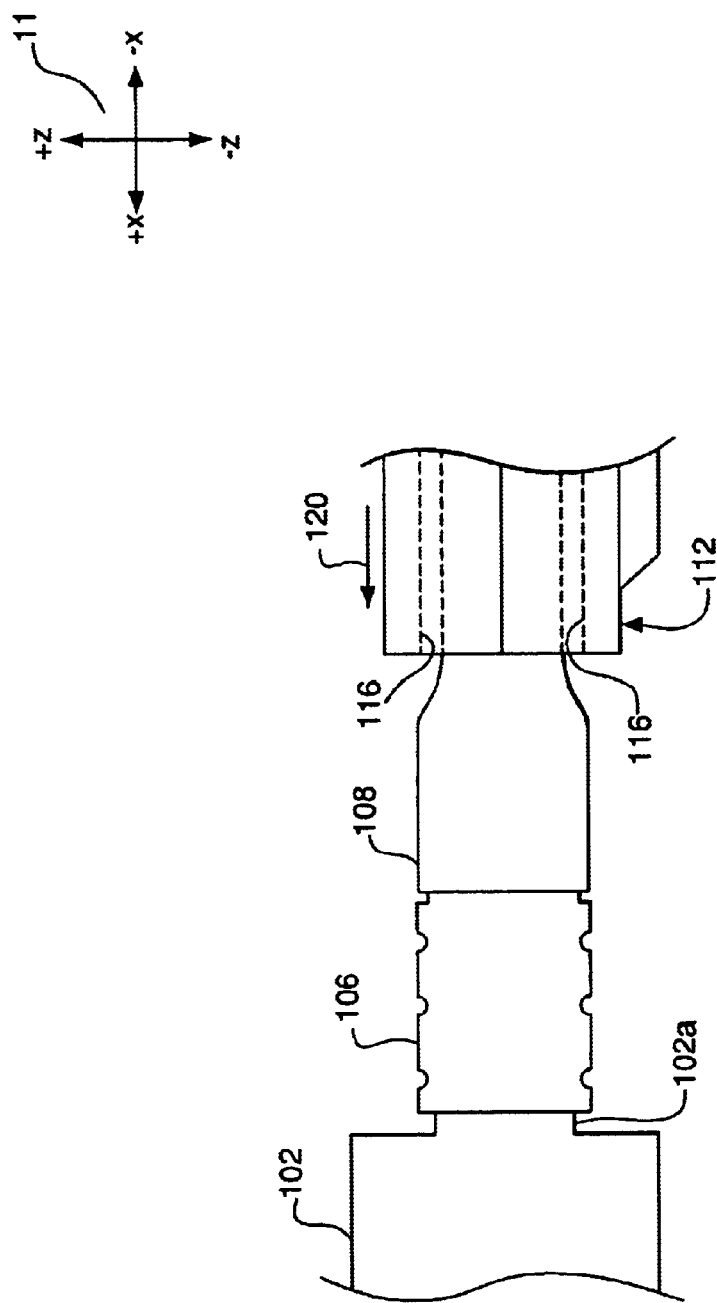
FIG. 1B is a diagrammatic side view of a portion of the conventional guide boot shown in FIG. 1 as the guide boot is mated with the connector shown in FIG. 1.
Figure 2:
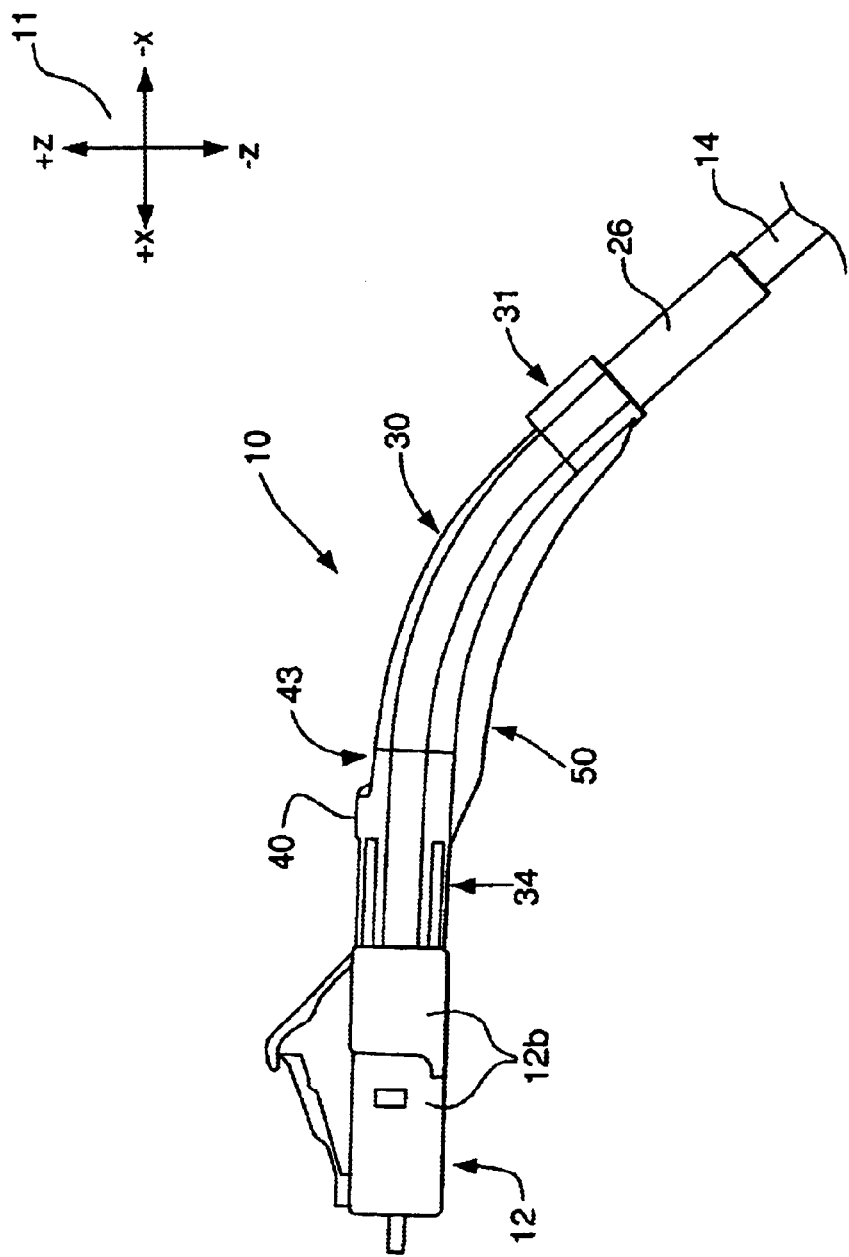
FIG. 2 is a side view of a preferred embodiment of a guide boot installed on a fiber optic cable and mated with a connector mechanically coupled to the fiber-optic cable.
Figure 3:
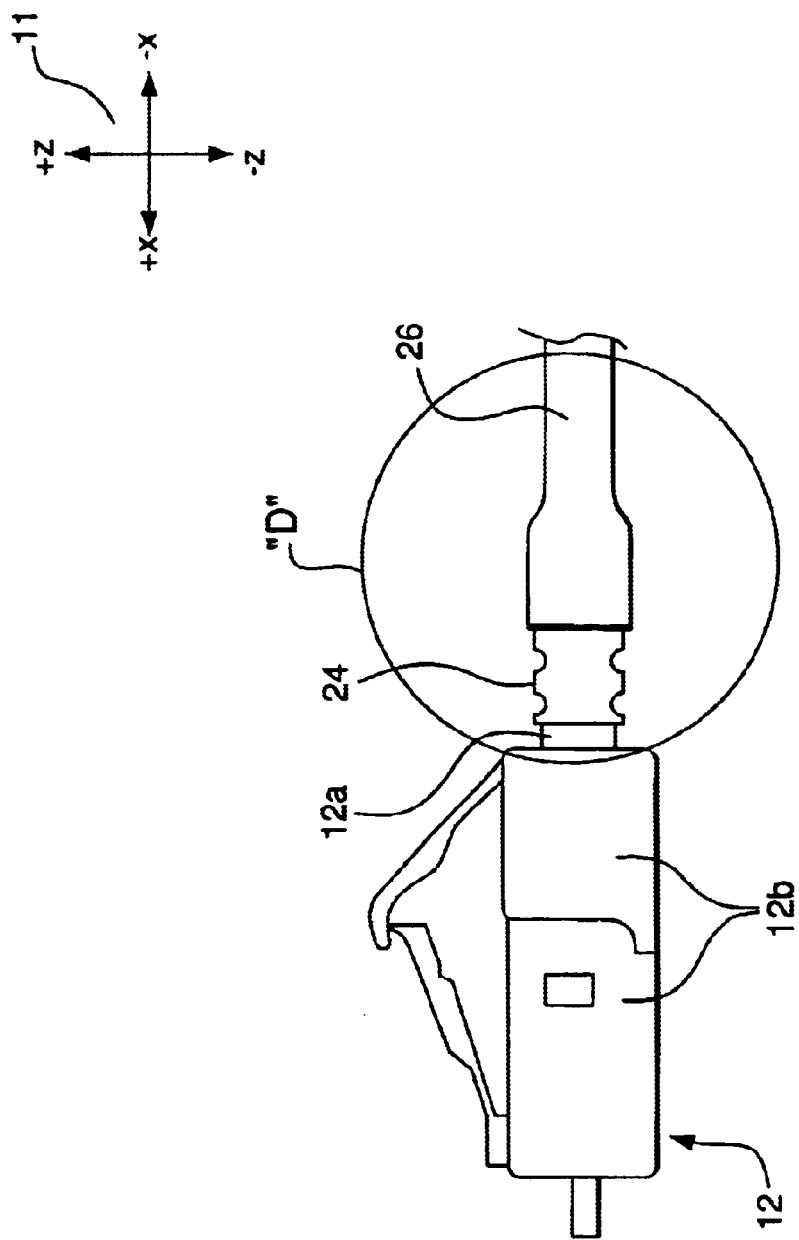
FIG. 3 is a side view of the connector and the fiber-optic cable shown in FIG. 2, without the guide boot shown in FIG. 2.
Figure 4:
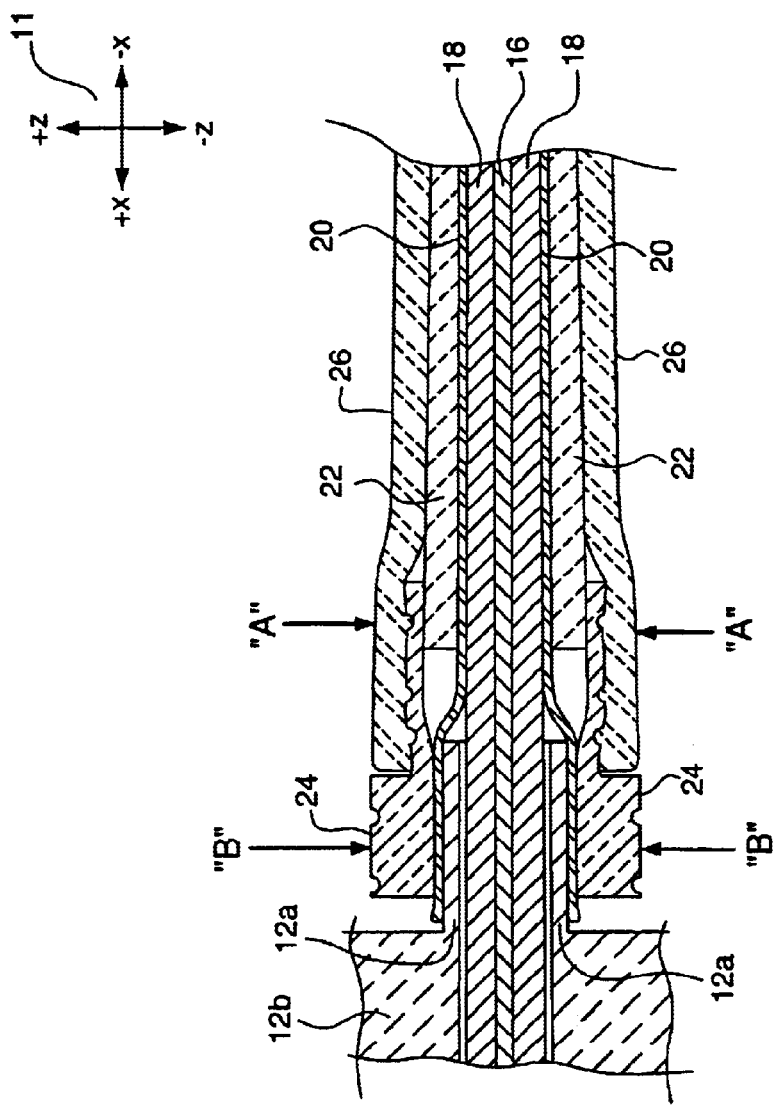
FIG. 4 is a longitudinal cross-sectional view of the area designated "D" in FIG. 3.
Figure 5:
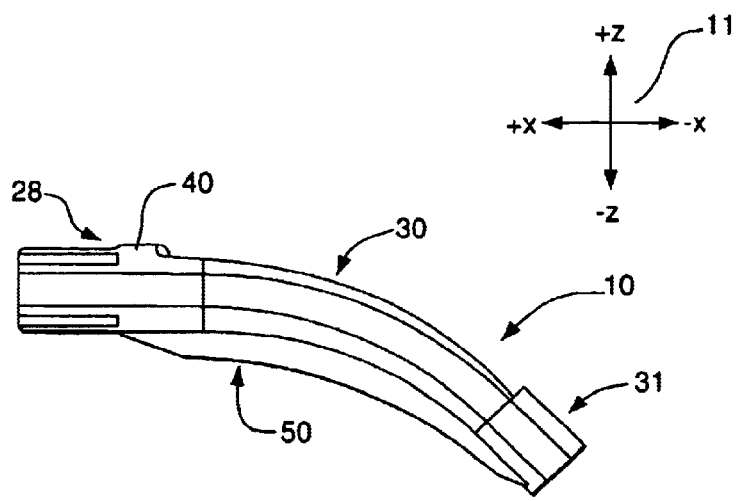
FIG. 5 is a side view of the guide boot shown in FIG. 1.

The guide boot 10 can receive a fiber-optic cable 14 optically and mechanically coupled to the connector 12 (see FIGS. 2–4). The guide boot 10 can be used to bend the fiber-optic cable 14 as the cable 14 exits the connector 12. Moreover, the guide boot 10 can be rotated in relation to the connector 12 to vary the direction in which the cable 14 extends from the connector 12.

The cable 14 comprises an optical fiber 16 (see FIG. 4). The optical fiber 16 includes a core formed from a substantially transparent material, and cladding that surrounds the core. The cladding is formed from a substantially transparent material having an index of refraction that differs from that of the core. The optical fiber 16 is enclosed by a flexible inner jacket 18 formed from a suitable thermoplastic material. The jacket 18 has sufficient stiffness to inhibit buckling of the optical fiber 16.

The jacket 18 is surrounded by a layer of fibers 20. The fibers 20 are formed from a material, such as KEVLAR, having sufficient strength to withstand the maximum anticipated tensile forces on the cable 14. The fibers 20 are enclosed by a flexible outer jacket 22 formed from, for example, polyvinyl chloride. Further details of the cable 14 are not necessary to an understanding of the invention, and therefore are not presented herein. Moreover, it should be noted that specific details of the cable 14 are presented for exemplary purposes only. The guide boot 10 can be used in conjunction with other types of fiber-optic cables.

The cable 14 is mechanically coupled to the connector 12 as depicted in FIGS. 3 and 4. In particular, the outer jacket 22 is stripped from an end portion of the cable 14, thereby exposing the underlying layer of fibers 20 and the inner jacket 18. A metallic crimp sleeve 24 and a shrink tube 26 are placed over the outer sleeve 22, proximate the exposed fibers 20 and inner jacket 18. The exposed inner jacket 18 (and the underlying optical fiber 16) are inserted into the connector 12 by way of a substantially cylindrical mating portion 12a thereof.

The exposed fibers 20 are positioned around the mating portion 12a as the inner jacket 18 and the optical fiber 16 are inserted into the connector 12. A forward portion of the crimp sleeve 24 is placed over the mating portion 12a so that the exposed fibers 20 are positioned between the mating portion 12a and the crimp sleeve 24. The forward portion of the crimp sleeve 24 is subsequently crimped over the mating portion 12a, thereby securing the crimp sleeve 24 to the connector 12.

A portion of the shrink tube 26 is positioned over a rearward portion of the crimp sleeve 24, as shown in FIG. 4. The shrink tube 26 is subsequently heated using, for example, a conventional heat gun. The shrink tube 26 shrinks in response to the heating thereof. The shrinkage of the shrink tube 26 causes the shrink tube 26 to securely grasp the crimp sleeve 24 and the outer jacket 22, thereby securing the crimp sleeve 24 (and the connector 12) to the cable 14. In other words, a forward portion of the shrink tube 26 is fixed in place over a rearward portion of the crimp sleeve 24, and a remainder of the shrink tube 26 is fixed in place over a portion of the cable 14. (A forward portion of the crimp sleeve 24 is thus exposed, i.e., is not covered by the shrink tube 26, as shown in FIGS. 3 and 4.)

Further details relating to the interface between the connector 12 and the cable 14 are not necessary to an understanding of the invention, and therefore are not presented herein. Moreover, the above-described procedure for securing the cable 14 to the connector 12 is presented for exemplary purposes only. The cable 14 can be secured to the connector 12 using other procedures.

The guide boot 10 receives the cable 14 and the shrink tube 26, and mates with the connector 12. More particularly, a portion of the guide boot 10 can be placed over, i.e., inserted onto, the crimp sleeve 24 (and the forward portion of the shrink tube 26 fixed thereto). The resulting friction between the guide boot 10 and the crimp sleeve 24 retains the guide boot 10 on the connector 12.

The design of the guide boot 10 is believed to substantially reduce the friction that occurs between the guide boot 10 and the shrink tube 26 as the guide boot 10 is inserted onto the crimp sleeve 24. Hence, the design of the guide boot 10 can potentially reduce the insertion force needed to mate the guide boot 10 with the connector 12.

The guide boot 10 can be used to bend the cable 14 as the cable 14 extends from the connector 12. The guide boot 10 preferably comprises a mating portion 28, a body portion 30, and an end portion 31 (see FIGS. 2 and 5–9). The mating portion 28 and the end portion 31 adjoin opposing ends of the guide boot 10. The mating portion 28 receives crimp sleeve 24, and the body portion 30 imparts a bend to the cable 14. The mating portion 28, body portion 30, and end portion 31 are preferably formed on a unitary basis. The guide boot 10 can be formed from a suitable elastomeric material such as ARNITEL 460.

The mating portion 28 is substantially cylindrical, and includes an interior surface 32. The interior surface 32 defines a passage 34 through the mating portion 28 (see, e.g., FIG. 7). The mating portion 28 can be inserted over the crimp sleeve 24 so that the passage 34 receives the crimp sleeve 24 (and the underlying mating portion 12a of the connector 12).

A plurality of elongated projections, or ribs 38, are formed on the interior surface 32 (see FIGS. 6–9). The ribs 38 extend longitudinally, i.e., in the "x" direction, along the interior surface 32. The ribs 38 preferably extend from a forward edge 32a of the interior surface 32, and span a portion of the length of the interior surface 32 as shown, for example, in FIG. 7. Each rib 38 preferably includes a substantially rounded upper surface 38a (see FIGS. 8 and 9). It should be noted that the upper surface 38a can be formed in other geometric configurations, e.g., square or rectangular, in alternative embodiments.

Six of the ribs 38 are formed on the interior surface 32. Two of the ribs 38 are arranged at the respective uppermost and lowermost (12:00 and 6:00 o'clock) positions on the interior surface 32 (from the perspective of FIG. 8). The remaining ribs 38 are circumferentially spaced from the uppermost or lowermost ribs 38 by an angular distance of approximately forty-five degrees. It should be noted that this particular configuration for the ribs 38 is disclosed for exemplary purposes only. Alternative embodiments can include a greater or lesser number of the ribs 38 circumferentially spaced by angular distances greater or less than forty-five degrees. The function of the ribs 38 is discussed below.

A forward portion of the shrink tube 26 is fixed to, and covers the rearward portion of the crimp sleeve 24, as discussed above. The diameter of the passage 34 in the guide boot 10 is preferably greater than the outer diameter of the forward portion of the shrink tube 26, when the shrink tube 26 is fixed to the crimp sleeve 24 as noted. (The outer diameter of the forward portion of the shrink tube 26 is denoted by the symbol "A" in FIG. 4.) In other words, a clearance preferably exists between the interior surface 32 of the mating portion 28 and the forward portion of the shrink tube 26 when the guide boot 10 is mated with the connector 12. This feature, as discussed below, is believed to reduce the insertion force needed to mate the guide boot 10 with the connector 12.

The ribs 38 are preferably dimensioned so that the ribs 38 interfere with the forward (exposed) portion of the crimp sleeve 24 when the mating portion 28 fully inserted onto the crimp sleeve 24, i.e., when the guide boot 10 is fully mated with the connector 12. In other words, the uppermost and lowermost ribs 38 are preferably spaced apart by a linear distance that is less than the outer diameter of the forward portion of the crimp sleeve 24. (The outer diameter of the forward portion of the crimp sleeve 24 is denoted by the symbol "B" in FIG. 4, and the linear spacing between the uppermost and lowermost ribs 38 is denoted by the symbol "C" in FIG. 8). This feature, as explained below, is believed to result in a frictional force between the ribs 38 and the crimp sleeve 24 when the guide boot 10 is fully mated with the connector 12. The frictional force helps to retain the guide boot 10 on the connector 12.

The mating portion 28 can also comprise an overhang 40. The overhang 40 is positioned immediately rearward of the uppermost three of the ribs 38, and covers the forward portion of the shrink tube 26 when the guide boot 10 is fully mated with the connector 12. The function of the overhang 40 is discussed below. It should be noted that alternative embodiments of the guide boot 10 can be formed without the overhang 40.

Figure 7:
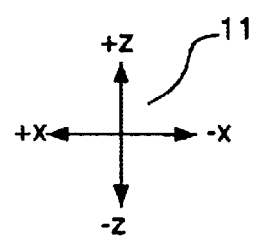
FIG. 7 is a cross-sectional view of the guide boot shown in FIGS. 1, 5, and 6, taken along the line "E—E" of FIG. 6.
Figure 7:
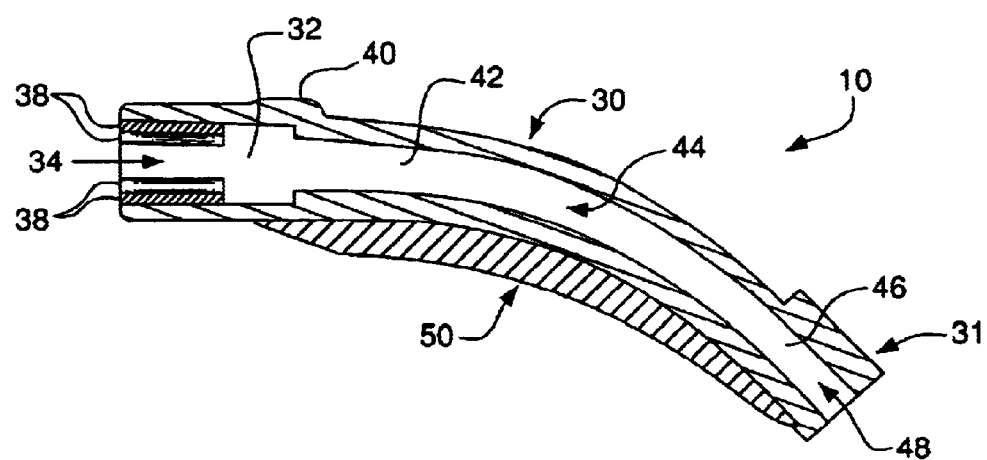
Figure 8:
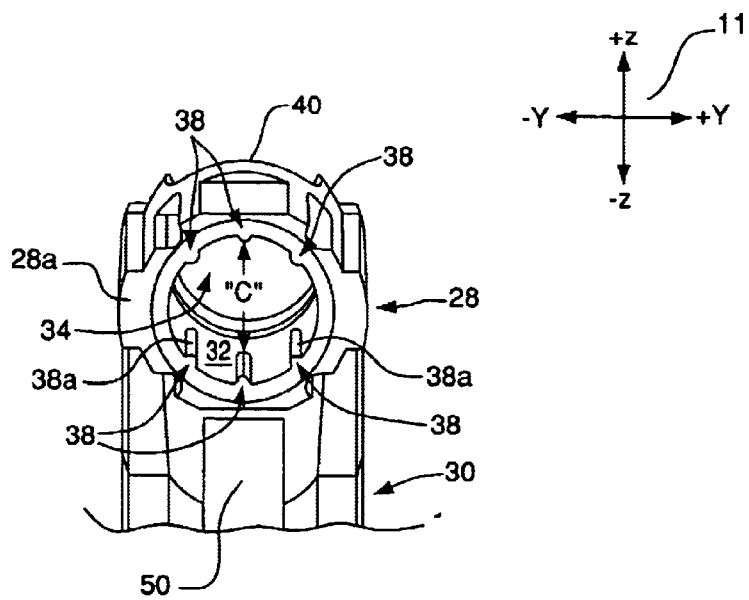
FIG. 8 is a front view of a portion of the guide boot shown in FIGS. 1 and 5–7.
Figure 9:
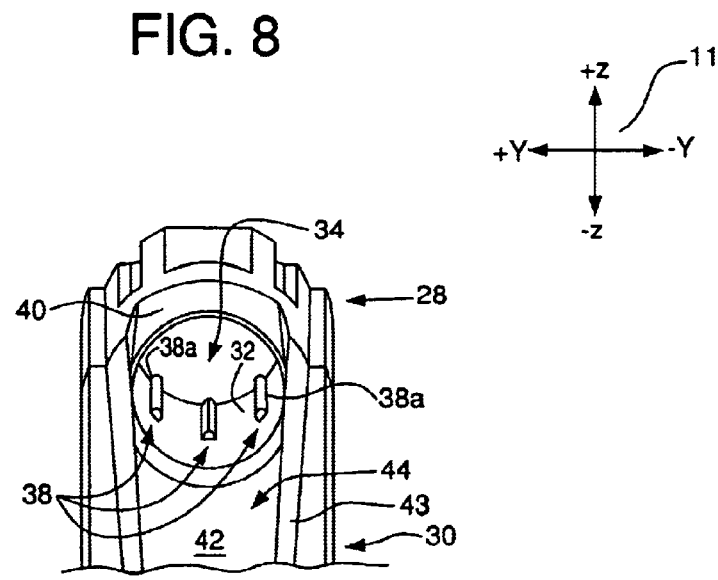
FIG. 9 is a rear view of a portion of the guide boot shown in FIGS. 1 and 5–8.

The body portion 30 of the guide boot 10 has an interior surface 42 that defines a passage 44 within the body portion 30 (see, e.g., FIG. 7). The passage 44 adjoins the passage 34 in the mating portion 28, and receives the cable 14. The body portion 30 and, in particular, the interior surface 42, are curved as shown in the figures. This curvature, as discussed below, imparts a corresponding bend to the cable 14 (and the shrink tube 26) when the guide boot 10 in installed on the cable 14. The radius of curvature of the interior surface 42 should be no less than the minimum bend radius of the cable 14.

Figure 6:
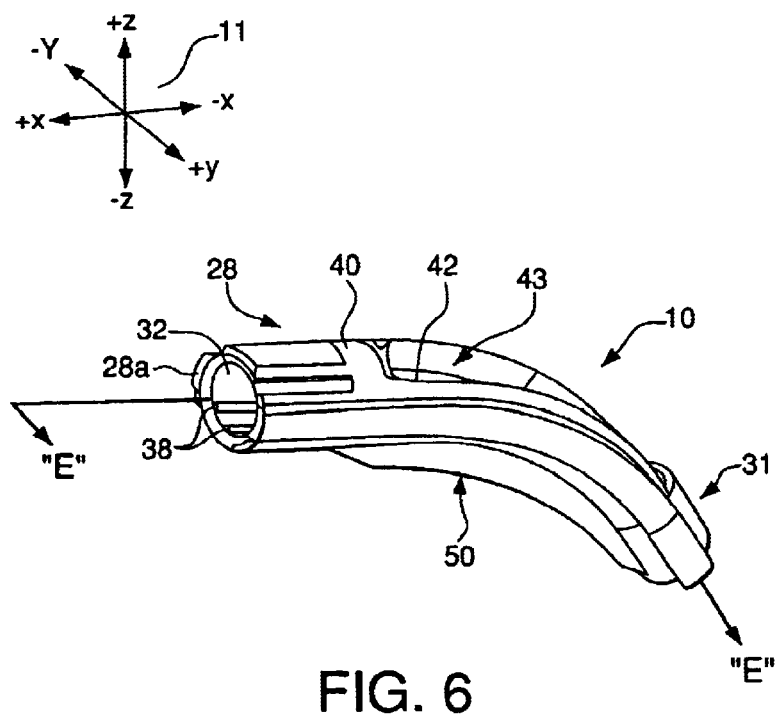
FIG. 6 is a top perspective view of the guide boot shown in FIGS. 1 and 5.

A window 43 can be formed in the body portion 14 (see, e.g., FIG. 6). It should be noted that alternative embodiments of the guide boot 10 can be formed without the window 43.

The end portion 31 of the guide boot 10 is substantially cylindrical, and has an interior surface 46. The interior surface 46 defines a passage 48 within the end portion 31 for receiving the cable 14 (see FIG. 7). The passage 48 adjoins the passage 44 formed in the body portion 30.

The guide boot 10 also comprises an external rib 50. The external rib 50 is preferably formed on the exterior of the mating portion 28, boot portion 30, and end portion 31, and extends along the bottom thereof (from the perspective of FIGS. 5–7). The external rib 50 is believed to stiffen the guide boot 10, and in particular, the body portion 30. The external rib 50 thereby assists in maintaining the curvature of the body portion 30. Maintaining the curvature of body portion 30 helps to ensure that the minimum bend radius of the cable 14 is not violated once the guide boot 10 has been installed on the cable 14 and mated with the connector 12.

The external rib 50 is positioned rearward of each rib 38 on the mating portion 28. Hence, the ribs 38 and the external rib 50 do not substantially overlap (from the perspective of FIG. 5). This feature, as discussed below, is believed to reduce the insertion force needed to mate the guide boot 10 with the connector 12.

The guide boot 10 can be mated with the connector 12 as follows. The cable 14 can be inserted into the guide boot 10 after the cable 12 has been optically and mechanically coupled to the connector 10. In particular, a free end of the cable 14 can be inserted through the mating portion 28, the body portion 30, and the end portion 31 of the guide boot 10 by way of the respective passages 34, 44, 48. The cable 14 can be advanced along the length of the cable 14 so that the mating portion 28 eventually reaches the shrink tube. 26, and the shrink tube 26 becomes disposed within the passages 34, 44, 48.

Figure 10:
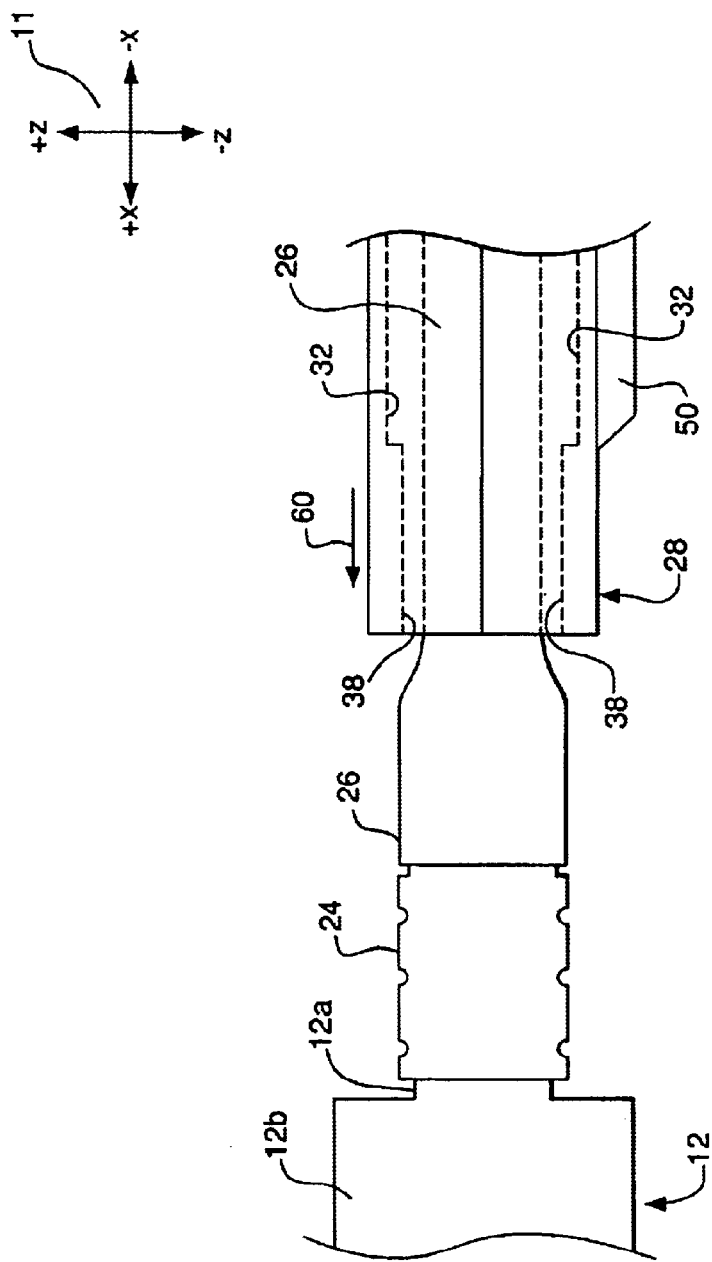
FIG. 10 is a diagrammatic side view of a portion of the guide boot shown in FIGS. 2 and 5–9 as the guide boot is mated with the connector shown in FIGS. 2–4.

Further advancement of the guide boot 10 causes the mating portion 28 to reach the crimp sleeve 24 (see FIG. 10). An insertion force can be exerted on the guide boot 10 to insert (advance) the guide boot 10 over the forward portion of the shrink tube 26, i.e., over the portion of the shrink tube 26 fixed onto the crimp sleeve 24, in the direction denoted by the arrow 60 in FIG. 10. In other words, an insertion force sufficient to overcome the friction between the mating portion 28 and the forward portion of the shrink tube 26 can be exerted on the guide boot 10 to cause the crimp sleeve 24 (and the forward portion of the shrink tube 10) to become disposed within the passage 34 in the mating portion 28.

A clearance preferably exists between the interior surface 32 of the mating portion 28 and the forward portion of the shrink tube 26, as discussed above. Hence, resistance to the advancement of the mating portion 28 onto the crimp sleeve 24 is initially generated primarily by friction between the ribs 38 and the forward portion of the shrink tube 26.

(The uppermost and lowermost ribs 38, as discussed above, are preferably spaced apart by a linear distance that is less than the outer diameter of the forward portion of the crimp sleeve 24. Notably, the interior surface 32 of the mating portion 28 does not substantially contact the forward portion of the shrink tube 28 as the guide boot 10 is advanced onto the crimp sleeve 24 (see FIG. 10). Hence, the interior surface 32 does not offer substantial resistance to the advancement of the mating portion 28 onto the crimp sleeve 24. Resistance to the advancement of the mating portion 28 is generated primarily by friction between the forward portion of the shrink tube 24 and the relatively small surface 38a of each of the ribs 38. Hence, the insertion force needed to advance the mating portion 28 over the forward portion of the shrink sleeve 26 is relatively low. The substantial advantages associated with this feature are discussed below.

The ribs 38 and the external rib 50 of the guide boot 10 do not substantially overlap, as discussed above. That is, the external rib 50 is positioned rearward of each rib 38 on the mating portion 28. This feature is believed to reduce the insertion force needed to mate the guide boot 10 with the connector 12. More particularly, the rib 50 is believed to inhibit radial expansion of the mating portion 28. The above-noted interference between the shrink tube 26 and the ribs 38 as the mating portion 28 is advanced onto the crimp sleeve 24 urges the mating portion 28 radially outward. Hence, positioning the external rib 50 behind the ribs 38 can permit the mating portion 28 to more readily expand in the radial direction in response to the advancement of the mating portion 28 over the crimp sleeve 24 (and over the forward portion of the shrink tube 26). This feature can thus reduce the insertion force needed to advance the mating portion 28 over the forward portion of the shrink tube 26.

The guide boot 10 is advanced along the cable 14 and the shrink tube 26 until a forward edge 28a of the mating portion 28 abuts a housing portion 12b of the connector 12 (see FIGS. 2 and 6). The guide boot 10 is fully mated with the connector 12 at this point.

The shrink tube 26 is positioned within the passages 34, 44, 48 when the guide boot 10 and the connector 12 are fully mated. Moreover, the ribs 38 are in contact primarily with the forward (exposed) portion of the crimp sleeve 24 when the guide boot 10 and the connector 12 are fully mated. The resulting friction between the ribs 38 and the forward portion of the crimp sleeve 24 helps to retain the guide boot 10 on the connector 12.

The mating portion 28 covers a substantial entirety of the crimp sleeve 24 when the guide boot 10 is fully mated with the connector 12. In particular, the overhang 40 covers the rearward portion of the crimp sleeve 24 (and the forward portion of the shrink tube 26 installed thereon) when the guide boot 10 is fully mated with the connector 12, and thereby serves to protect the shrink tube 26.

The guide boot 10 can be rotated in relation to the connector 12 to cause the cable 14 to extend in a desired direction upon exiting the guide boot 10 (as for cable organizing, etc.). The guide boot 10 is rotated by imparting a torque to the guide boot 10 sufficient to overcome the friction between the ribs 38 and the crimp sleeve 24. This action causes the mating portion 28 to rotate around the crimp sleeve 24 (and the underlying mating portion 12a of the housing 12). (The cable 14, which is secured to the connector 12 by way of the shrink tube 26 and the crimp sleeve 24, does not rotate with the mating portion 28.) Furthermore, by the passage 34 having a diameter greater than the outer diameter of the shrink tube 26, rotation of the guide boot 10 does not rotate the cable 14.

The mating portion 28 and the end portion 31 of the guide boot 10 restrain the shrink tube 26 (and the underlying portion of the cable 14) so that the shrink tube 26 follows the interior surface 42 of the body portion 30. The curvature of the interior surface 42 imparts a bend to the shrink tube 26. This bend is forty-five degrees in the guide boot 10. In other words, the shrink tube 26 and the cable 14 enter the guide boot 10 by way of the mating portion 28 in a first direction, and exit the guide boot 10 by way of the end portion 31 in a second direction. The angle between the first and second directions is approximately 45 degrees (this angle is hereinafter referred to as the "bending angle" of the guide boot 10).

It should be noted that a particular bending angle for the guide boot 10 is disclosed for exemplary purposes only. Alternative embodiments of the guide boot 10 can be configured to bend the cable 14 at virtually any angle, including 90 degrees, provided the minimum bend radius of the cable 14 is not violated.

The relative stiffness of the guide boot 10, and in particular, the body portion 30, can prevent the cable 14 from being bent in excess of the radius of curvature of the body portion 30. (The radius of curvature of the body portion 30, as discussed above, should be approximately equal to or greater than the minimum bend radius of the cable 14.) The guide boot 10 thus enables the cable 14 to be bent so as to direct the cable 14 toward a desired location, while protecting the cable 14 from being bent beyond its minimum bend radius.

The guide boot 10, as discussed above, incorporates features that can substantially reduce the insertion force needed to mate the guide boot 10 with the connector 12. For example, Applicant has measured the insertion force needed to mate an actual embodiment of a guide boot similar to the guide boot 10 with an LC-type connector similar to the connector 12. The results indicate that when using the invention, approximately four times less force is needed than is needed to mate a conventional guide boot with the same connector.

Reducing the insertion force needed to mate a guide boot such as the guide boot 10 with a connector such as the connector 12 can provide substantial advantages. For example, reducing the insertion force and, more particularly, reducing the friction between the shrink tube 26 and the mating portion 28 can substantially reduce the potential for damage to the optical fiber 16, as discussed with respect to prior art guide boots and connectors.

The relatively low insertion force needed mate the inventive guide boot 10 with the connector 12 can thus reduce the potential for damage to the optical fiber 16 when the guide boot 10 is mated with the connector 12. Moreover, the guide boot 10, and in particular the ribs 38, can generate sufficient friction to securely retain the guide boot 10 on the connector 12 itself despite the low-insertion-force characteristics of the guide boot 10.

It is to be understood that even though numerous characteristics and advantages of the present invention have been set forth in the foregoing description, the disclosure is illustrative only and changes can be made in detail within the principles of the invention to the full extent indicated by the broad general meaning of the terms in which the appended claims are expressed.

What is claimed is:

1. A guide boot for a fiber-optic cable mechanically coupled to a connector, comprising:
   a mating portion having an interior surface defining a passage for receiving a portion of the connector and the fiber-optic cable, and a plurality of ribs formed on the interior surface and extending along at least a portion of a length of the mating portion; and
   a body portion adjoining the mating portion and having an interior surface that defines a passage for receiving the fiber-optic cable, the interior surface of the body portion being curved so that the body portion bends the fiber-optic cable.

2. The guide boot of claim 1, wherein six ribs are formed on the interior surface of the mating portion.

3. The guide boot of claim 2, wherein a first of the ribs is formed at a top of the interior surface of the mating portion, a second on the ribs is formed at a bottom of the interior surface of the mating portion, and a remainder of the ribs are spaced from one of the first and second ribs by an angular distance of approximately forty-five degrees.

4. The guide boot of claim 1, wherein the body portion has a window formed therein and the mating portion comprises an overhang adjacent the window.

5. The guide boot of claim 1, wherein the ribs extend substantially parallel to a longitudinal axis of the mating portion.

6. The guide boot of claim 1, wherein each of the ribs has a substantially rounded outer surface.

7. The guide boot of claim 1, wherein the ribs generate a frictional force when the mating portion receives the portion of the connector and the frictional force secures the guide boot to the connector.

8. The guide boot of claim 1, wherein the ribs locally reduce a diameter of the passage defined by the mating portion so that the ribs generate a frictional force and the interior surface of the mating portion does not generate a frictional force large enough to damage a shrink tube of the connector when the guide boot is mated with to connector.

9. The guide boot of claim 1, further comprising an end portion for restraining the fiber-optic cable, the end portion adjoining the body portion and having an interior surface that defines a passage for receiving the fiber-optic cable.

10. The guide boot of claim 1, further comprising an external rib formed on an exterior surface of the mating portion and an exterior surface of the body portion, wherein the external rib is positioned rearward of said plurality of ribs.

11. A guide boot for bending a fiber-optic cable mechanically coupled to a connector by way of a crimp sleeve and a shrink tube, comprising:
    a mating portion, the mating portion having an interior surface defining a passage for receiving the crimp sleeve and a portion of the shrink tube installed over the crimp sleeve, the passage having a diameter greater than an outer diameter of the portion of the shrink tube installed over the crimp sleeve and the interior surface having a plurality of ribs formed thereon for contacting the crimp sleeve; and
    a body portion adjoining the mating portion and having an interior surface defining a passage for receiving the fiber-optic cable.

12. The guide boot of claim 11, wherein six of the ribs are formed on the interior surface of the mating portion.

13. The guide boot of claim 12, wherein a first of the ribs is formed at a top of the interior surface of the mating portion, a second on the ribs is formed at a bottom of the interior surface of the mating portion, and a remainder of the ribs are spaced from one of the first and second ribs by an angular distance of approximately forty-five degrees.

14. The guide boot of claim 11, further comprising an external rib formed on an exterior surface of the mating portion and an exterior surface of the body portion, wherein the external rib is positioned rearwardly of said plurality of ribs.

15. The guide boot of claim 11, wherein the body portion has a window formed therein and the mating portion comprises an overhang adjacent the window.

16. The guide boot of claim 11, wherein the ribs extend substantially parallel to a longitudinal axis of the mating portion.

17. The guide boot of claim 11, wherein each of the ribs has a substantially rounded outer surface.

18. The guide boot of claim 11, wherein the interior surface of the body portion is curved so that the body portion bends the fiber-optic cable.

19. The guide boot of claim 11, further comprising an end portion adjoining the body portion and having an interior surface that defines a passage for receiving the fiber-optic cable.

20. The guide boot of claim 11, wherein the contact between the ribs and the crimp sleeve secures the guide boot to the connector.

21. The guide boot of claim 11, wherein the ribs interfere with the portion of the shrink tube installed over the crimp sleeve and the interior surface of the mating portion does not substantially interfere with the portion of the shrink tube installed over the crimp sleeve when the guide boot is mated with the connector.

22. A system for conducting optical signals, comprising:
    a connector;
    a crimp sleeve fixed to the connector;
    a fiber-optic cable;
    a shrink tube having a first portion fixed to the crimp sleeve and a second portion fixed to the fiber-optic cable; and
    a guide boot comprising (i) a mating portion, the mating portion having an interior surface defining a passage for receiving the crimp sleeve and the first portion of the shrink tube, the passage having a diameter greater than an outer diameter of the first portion of the shrink tube and the interior surface having a plurality of ribs formed thereon for contacting the crimp sleeve, and (ii) a body portion adjoining the mating portion and having an interior surface defining a passage for receiving the fiber-optic cable;
    wherein by said passage having a diameter greater than the outer diameter of said shrink tube, rotation of said guide boot does not rotate said fiber-optic cable.

23. The guide boot of claim 22, wherein the connector is an LC-type connector.

24. The guide boot of claim 22, wherein the contact between the ribs and the crimp sleeve generates a frictional force that secures the guide boot to the connector.

25. The guide boot of claim 22, wherein the ribs substantially interfere with first portion of the shrink tube and the interior surface of the mating portion does not substantially interfere with the first portion of the shrink tube when the guide boot is mated with the connector.

26. A method for mating a guide boot with a connector mechanically coupled to a fiber-optic cable by way of a crimp sleeve and a shrink tube, comprising:
    inserting the fiber-optic cable through a passage formed in the guide boot;
    advancing the guide boot along the fiber-optic cable;
    advancing the guide boot onto the crimp sleeve so that a plurality of ribs formed on an internal surface of the guide boot interferely contact the crimp sleeve and a portion of the shrink tube installed over the crimp sleeve; and
    rotating the guide boot so that the fiber-optic cable extends from the guide boot in a desired direction without being twisted.

* * * * *